(12) United States Patent
Madson

(10) Patent No.: US 9,109,727 B1
(45) Date of Patent: Aug. 18, 2015

(54) TOOL APPARATUS FOR USE WITH A CONDUIT UNION

(71) Applicant: Dane Curtis Madson, Longview, TX (US)

(72) Inventor: Dane Curtis Madson, Longview, TX (US)

( * ) Notice: Subject to any disclaimer, the term of this patent is extended or adjusted under 35 U.S.C. 154(b) by 0 days.

(21) Appl. No.: 14/081,457

(22) Filed: Nov. 15, 2013

(51) Int. Cl.
| F16L 55/00 | (2006.01) |
| F16L 19/02 | (2006.01) |
| F16B 37/00 | (2006.01) |
| B25B 13/30 | (2006.01) |

(52) U.S. Cl.
CPC ............. *F16L 19/0218* (2013.01); *F16B 37/00* (2013.01); *F16L 55/00* (2013.01); *B25B 13/30* (2013.01)

(58) Field of Classification Search
CPC ...... B25B 13/30; B25B 13/28; B25B 13/505; F16B 37/00; F16B 37/02; B24B 45/006
USPC .................................. 81/124.3, 463
See application file for complete search history.

(56) References Cited

U.S. PATENT DOCUMENTS

| 604,224 | A | * | 5/1898 | Bennik ........................... 285/34 |
| 878,388 | A | * | 2/1908 | Heimann ........................ 81/58.5 |
| 2,016,262 | A | * | 10/1935 | Arey et al. .................... 285/330 |
| 2,417,025 | A | * | 3/1947 | Volpin ............................ 285/91 |
| 2,712,766 | A | * | 7/1955 | Buttle ........................... 81/185.1 |
| 2,971,782 | A | * | 2/1961 | Sparkman et al. .......... 285/332.3 |
| 3,008,363 | A | * | 11/1961 | Cook ............................ 81/124.3 |
| 3,181,896 | A | * | 5/1965 | Russell ........................... 285/15 |
| 3,746,376 | A | * | 7/1973 | Gold ........................... 285/334.2 |
| 3,807,773 | A |   | 4/1974 | Brune |
| 4,226,164 | A | * | 10/1980 | Carter ........................... 411/433 |
| 4,923,349 | A | * | 5/1990 | Logsdon ....................... 411/433 |
| 5,011,196 | A |   | 4/1991 | Sabatier et al. |
| 6,139,068 | A |   | 10/2000 | Burress et al. |
| 6,412,832 | B1 | * | 7/2002 | Donoho et al. ............ 285/334.5 |
| 6,764,109 | B2 |   | 7/2004 | Richardson et al. |
| 6,945,569 | B1 | * | 9/2005 | Diaz et al. ..................... 285/388 |
| 7,125,055 | B2 |   | 10/2006 | Dallas |
| 8,118,528 | B2 | * | 2/2012 | Herndon ...................... 411/432 |
| 8,408,605 | B2 |   | 4/2013 | Curtiss |
| 8,573,096 | B1 | * | 11/2013 | De Los Santos ............... 81/463 |
| 8,628,091 | B2 | * | 1/2014 | Davison ........................ 277/314 |
| 8,657,547 | B2 | * | 2/2014 | Herndon ...................... 411/432 |
| 9,039,046 | B2 | * | 5/2015 | Beagen, Jr. ................... 285/367 |
| 2012/0014765 | A1 | * | 1/2012 | Ries ............................. 411/433 |
| 2012/0048069 | A1 |   | 3/2012 | Powell |

* cited by examiner

*Primary Examiner* — Hadi Shakeri
*Assistant Examiner* — Danny Hong
(74) *Attorney, Agent, or Firm* — Egbert Law Offices, PLLC

(57) ABSTRACT

A tool apparatus for use with a conduit union having a non-circular outer surface, the tool having a body with an interior wall that is conformable to at least a portion of the outer surface of the conduit union. The body is movable between open and closed positions. The closed position is suitable for extending around and locking over the conduit union. A plurality of wing members extend radially outwardly of the body. In particular, when the conduit union has a plurality of hammer wings, the inner wall of the body defines a plurality of cavities suitable for receiving the hammer wings when the body is in the closed position. The body includes a first body portion hingedly connected to a second body portion, and a lock mechanism cooperative with the first and second body portions so as to lock the first and second body portions in the closed position.

13 Claims, 6 Drawing Sheets

TOOL APPARATUS FOR USE WITH A CONDUIT UNION

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to conduit unions. More particularly, the present invention relates to tools for attaching and releasing conduit unions from pipe connections. The present invention also relates to hammer unions whereby the force of a hammer is applied to hammer wings of the hammer union so as to tighten and release the union from the pipes.

2. Description of Related Art Including Information Disclosed Under 37 CFR 1.97 and 37 CFR 1.98.

Threaded unions, in particular "hammer unions", are commonly used in petroleum exploration and production to join conduits together, for example, conduits containing high-pressure fluids, such as drilling mud, fracturing fluids, and oil and gas produced incidental to drilling activities. Hammer unions are generally considered to be economical, simple, reliable and robust. They are very easy to make-up and break-out quickly. Examples of hammer unions include, but are not limited to, WECO™ brand hammer unions available from FMC Technologies of Houston, Tex. Typically, hammer unions are used in more temporary situations, such as joining together sections of joints used for pumping fracturing fluids into a well bore under high pressure. In these applications, hammer unions rarely loosen in service because the duration of the application is short. However, hammer unions may also be used in certain long-term applications for their ease of make-up and break-out, especially, for example, for equipment that may need to be replaced quickly and efficiently (e.g., rotary hoses for conveying drilling mud between a stand pipe manifold and a rotary swivel or top drive, or components of a choke manifold, such as valves, chokes and spools which may fail unexpectedly due to erosive flows).

In industrial piping, plumbing and flow lines systems, the hammer union or conduit union generally will receive some slight or significant degree of visible external damage because of the repeated direct contact use of a sledgehammer that is used against the hammer union or conduit union. In other circumstances, a common pipe wrench is applied. The common pipe wrench is equipped with serrated external gripping teeth on gripping jaws so as to automatically generate a visible bite so as to produce marring or deformation of the union. This can result in permanent marring or gouging of the conduit union.

Various service applications of different sizes and pressure ratings of conduit unions are available. Conduit unions are known to freeze-up and lock into a firmly jointably affixed non-adjustable or non-removable condition. This is often the result of a lack of thread joint lubrication and corrosion resistant compounds applied to the original male thread union half and corresponding female union half. This locked-in-place adhesion can also occur simply because of long-term usage. As a result, corrosion can occur which causes the conduit union to be frozen and non-operable.

The general forceful over-tightening of the conduit union can inherently create a situation where the user is unable to fully disconnect the jointably connected conduit union because of the over-rated force applied during the assembly. This makes the fully-assembled conduit union nearly impossible to remove or to disassemble for common replacement or repositioning purposes.

Standard hammer unions do not provide an adequate extended length and width contact surface for use with a sledgehammer. This can create a situation where the powerful sledgehammer swings are not correctly directed to the hammer wings of the conduit union, as the user is very likely to mis-swing or partially deflect a sledgehammer swing. This can result in strikes to a lower extremity of the sledgehammer user and can cause potential severe injury to the sledgehammer user. Additionally, the relatively small hammer wings of the hammer unions can cause the sledgehammer user to miss the hammer wings and cause strikes to undesired external surfaces, such as the conduits or surrounding piping.

In other circumstances, a common crescent wrench is utilized for applying a makeup or break-out of the conduit union. The crescent wrench is particularly developed for use in association with standard hexagonal-shaped or octagonal-shaped outer surfaces of the conduit union. These standard crescent wrenches are often known to break at the main adjustable and loosely-affixed jaw section when struck forcefully along the length of the handle with a hammer or other device.

In the past, various patents have issued relating to such hammer unions. For example, U.S. Pat. No. 2,417,025, issued on Mar. 4, 1947 to A. S. Volpin, describes a hammer-lock union that has a bushing for connection to one pipe and a head for connection to the other pipe. A clamp ring engages the bushing. Interfitting portions on the head and ring exert a force so as to pull the bushing and head together upon relative rotation. The hammer union has means available for allowing the user to apply hammer forces so as to move the coupling from a locking position to a released position.

U.S. Pat. No. 3,807,773, issued on Apr. 30, 1974 to H. Brune, describes a conduit union in which a gasket is disposable in sandwiched relation between the mating male and female elements of a conduit union. A cam surface is provided on the annulus and there is a formation on one of the union elements that conforms to and cooperates with the cam surface to constrict it into gripping and sealing relation with the conduit end and into sealing relation with the other conduit element when the union elements are tightened together.

U.S. Pat. No. 5,011,196, issued on Apr. 30, 1991 to Sabatier et al., discloses a union for fluid conduits. Each end fitting of the union has an end for fixing the fluid line and a coaxial metallic body terminating in an annular radial polished section where the internal bore of the union issues. A washer is made of a deformable synthetic material that is pressed on this metallic body and has a flat annular radial face which, together with the polished section, forms the free face for connecting the end fitting. A pair of clamping half-shells grip the two end fittings to ensure the connection of the fluid lines.

U.S. Pat. No. 6,764,109, issued on Jul. 20, 2004 to Richardson et al., provides a hammer union and seal. The hammer union includes a thread end, a nut end, and a hammer nut which, when cinched up, compresses a composite seal assembly so as to prevent leakage. The seal assembly comprises a metal insert of a size to pass into the seal groove of conventional hammer union and a small seal acting between the insert, the thread end and the nut end.

U.S. Pat. No. 7,125,055, issued on Oct. 24, 2006 to L. M. Dallas, discloses a metal ring gasket for a threaded union. The metal ring gasket is made up of carbon steel or stainless steel. The metal ring gasket has beveled corners and is received in a beveled annular groove on mating surfaces of the subcomponents of the threaded unit. When compressed in the annular groove between the subcomponents, the metal ring gasket creates an energized, high-pressure, fluid-tight seal that is highly resistant to pressure and is capable of maintaining a seal even at elevated temperatures.

U.S. Pat. No. 8,118,528, issued on Feb. 21, 2012 to L. Herndon, teaches a field-replaceable wing nut having an arcuate body and an arcuate insert. The wing nut is designed to replace an existing wing nut which has deformed or has non-useable lugs on a hammer union connection. The wing nut has accurate alignment of the mounting threads using an alignment attachment device.

U.S. Pat. No. 8,408,605, issued on Apr. 2, 2013 to J. P. Curtiss, provides a hammer union lock that has a threaded union nut configured to couple abutting ends of a threaded nipple on a distal end of a first joint and a shouldered nipple on a distal end of a second joint. There is a lower wedge and an upper wedge positioned within an offset distance formed between a lower surface of the union nut and an upper surface of an enlarged section of the shouldered nipple.

U.S. Patent Publication No. 2012/0048069, published on Mar. 1, 2012 to D. Powell, discloses a tool for hammer unions. In particular, this tool is in the nature of crescent wrench. There is a hammer-union-receiving clamp at one end of the tool. Slots are provided within the head of the tool so as to engage the hammer wings of the hammer union. A handle extends outwardly from the head so as to allow a leveraged force to be applied so as to make-up or break-out the hammer union.

U.S. Pat. No. 6,139,068, issued on Oct. 31, 2000 to Burress et al., provides a union lock for maintaining connection between a pair of conduits. The union lock provides a pair of bridgepieces. Each of the bridgepieces has an elongated member. A substantially semicircular flange is coupled to each end of the elongated members. A tab is coupled to each end of the flanges. Each tab has a hole formed therein for receiving a connector. A substantially circular flange is provided at the end of the elongated members.

It is an object of the present invention to provide a conduit union tool that fits all conduit union sizes, shapes and pressure ranges.

It is another object of the present invention to provide a conduit union tool that allows for the removal of worn and seized-in-place conduit unions.

It is another object of the present invention to provide a conduit union tool that reduces downtime and improves safety.

It is still a further object of the present invention to provide a conduit union tool that provides a large strike surface and an improved strike hit contact ratio.

It is another object of the present invention to provide a conduit union tool that reduces accidental strikes to secondary surfaces adjacent to the conduit union.

It is another object of the present invention to provide a conduit union tool that provides 360 degrees of protection to the conduit union.

It is still another object of the present invention to provide a conduit union tool that applies generally equal force around the entire circumference of the tool.

It is another object of the present invention to provide a conduit union tool that improves manipulation of poorly-installed piping systems.

It is still a further object of the present invention to provide a conduit union tool that is reuseable.

It is a further object of the present invention to provide a conduit union tool that minimizes direct damage to the conduit union.

It is still a further object of the present invention to provide a conduit union tool that allows for more forceful hammer blows.

It is still another object of the present invention to provide a conduit union tool that facilitates the use of the tool in tightly confined work environments.

It is still a further object of the present invention to provide a conduit union tool that facilitates release of over-tightened conduit unions.

It is still another object of the present invention to provide a conduit union tool that prevents vandalism or sabotage.

These and other objects and advantages of the present invention will become apparent from a reading of the attached specification and appended claims.

BRIEF SUMMARY OF THE INVENTION

The present invention is a tool apparatus for use with a conduit union. The conduit union has a non-circular or irregular outer surface. The tool apparatus includes a body having an interior wall. The interior wall is conformable to at least a portion of the outer surface of the conduit union. The body is movable between an open position and a closed position. The closed position is suitable for extending around and locking over the conduit union. A plurality of wings members extend radially outwardly of the body.

In particular, the conduit union is of a type having a plurality of hammer wings extending radially outwardly therefrom. The interior wall of the body defines a plurality of cavities suitable for receiving the hammer wings when the body is in the closed position. In particular, the conduit union can have three hammer wings extending in evenly circumferentially-spaced relationship. The body has corresponding three cavities also in evenly circumferentially-spaced relationship.

In the present invention, the body includes a first body portion and a second body portion. The second body portion has a hinge connection with the first body portion. The first body portion is pivotable away from the second body portion when the body portions move toward the open position from the closed position. A lock mechanism is cooperative with the first and second body portions so as to lock the first and second body portions in the closed position. The lock mechanism is positioned opposite to the hinge connection.

The first body portion has a first hole formed therein. The second body portion also has a first hole formed therein. The first holes of the first and second body portions coincide. The hinge connection includes a swivel extending through the first holes of the first and second body portions, a swivel head affixed to an end of the swivel, and a retaining member extending through an orifice of the swivel and through an orifice of the swivel head so as to lock the swivel head to the swivel. The first body portion has a second hole formed away from the first hole of the first body portion. The second body portion also has a second hole formed away from the first hole of the second body portion. The second holes of the first and second body portions coincide when the body is in the closed position. The lock mechanism can include a rod extending through the second holes of the first and second body portions. The rod has an end extending outwardly of the body portions. A locking head is affixed to this end of the rod. The locking head is releaseably secured to the end of the rod. The rod is removably received in the second holes of the first and second body portions.

Within the preferred embodiment of the present invention, each of the plurality of cavities will have a generally rectangular cross-sectional area. However, in those circumstances where the conduit union has a generally triangular shape, the inner wall of the body will define receptacles for respective vertices of the conduit union. In other circumstances where the conduit union has an outer wall of a polygonal shape, the inner wall of the body will define surfaces that conform to faces of the outer wall of the conduit union.

In the present invention, each of the wing members will have a length that is substantially greater than a length of the hammer wing of the conduit union. Each of the wing members will also have a width that is substantially greater than a width of the hammer wing of the conduit union. As such, a substantially greater surface area is provided for hammer strikes.

The conduit union tool of the present invention is an excellent mechanical tool which limits and significantly reduces the material stress, damage and harmful forces that are applied to the conduit union. The present invention also avoids such damage to associated piping and other materials. The conduit union tool of the present invention greatly decreases the scheduled time frame that is necessary to carry out the entire disassembly or assembly of the various conduit unions in a service application. The conduit union tool of the present invention also greatly reduces the overall time frame necessary to complete and finish any scheduled regulatory agency chemical plant shut downs, chemical retrofits, or chemical plant inspection of materials and equipment.

The conduit union tool of the present invention is particularly configured to provide a means for the forced leverage assistance under those circumstances where the user defines the conduit union assembly frozen tight to the conduits. The present invention also greatly reduces personal injury to the user by providing a greater longitudinal surface contact point region on each of the wing members. The present invention also provides a much wider and greatly increased width of each contact surface of the wing member in order to provide both an increase in width and length of the strikable surface regions. This provides the user with a safer strike point surface area and increased reliability.

The conduit union tool of the present invention provides an increased near direct force leverage for the hammer strikes that are necessary for the common make up and break-out for all sizes and pressure ranges of such hammer unions, hammerless-type wing nut-type connection assemblies, and all multi-point external tool grippage-type union connection assemblies. In particular, the conduit union tool of the present invention can be provided for the most common applications, such as in oil and gas flow line connections or in industrial and hydraulic flow line connections.

The conduit union tool of the present invention eliminates the need to use crescent wrenches when applying a make up or break-out of the conduit union. As such, the present invention eliminates the common problem associated with such crescent wrenches in that they are known to break at the jaw section when struck forcibly along the length of the handle with a hammer. As such, once again, the present invention greatly improves the safety associated with the hammer union.

DETAILED DESCRIPTION OF THE INVENTION

Figure 1:
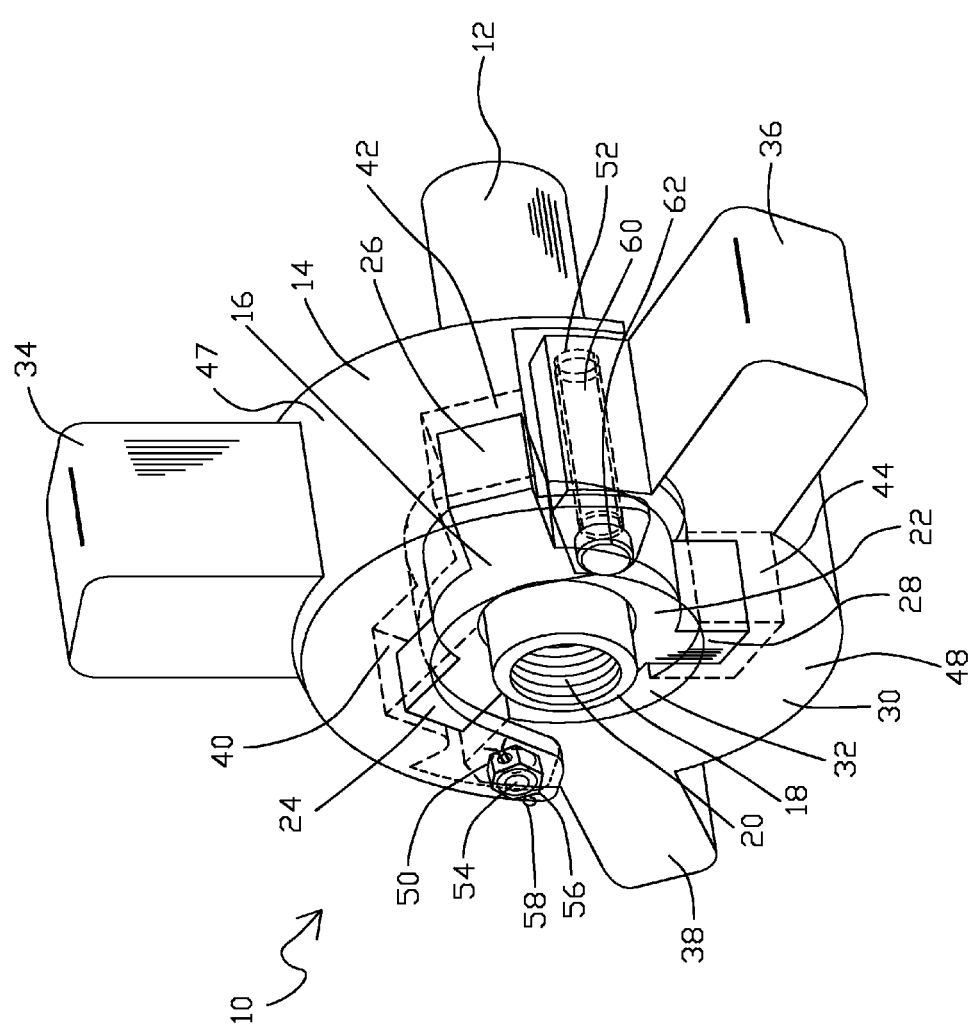
FIG. 1 is a perspective view, partially transparent, showing the application of the conduit union tool of the present invention to the hammer wings of a conduit union.

Referring to FIG. 1, there is shown the apparatus 10 of the present invention for use with a union for conduit 12. In particular, the apparatus 10 includes a conduit union tool 14 that is affixed over a conduit union 16. Conduit union 16 is directly applied to the conduit 12. Conduit 12 has a hammer union nipple 18 extending outwardly of the conduit union 16. The hammer union nipple 18 can have a threaded bore 20.

In the present invention, it can be seen that the conduit union 16 is in the nature of a hammer union. In particular, the conduit union 16 has a main body 22 that is applied directly over the outer surfaces of the conduit 12. A plurality of hammer wings 24, 26 and 28 radiate outwardly of the main body 22. The hammer wings 24, 26 and 28 are evenly circumferentially spaced from each other around the main body 22. As such, the hammer wings 24, 26 and 28, in normal use, would provide a surface area whereby sledgehammer strikes could be applied for the make up or break-out of the conduit union 16 from the conduit 12. Each of the hammer wings 24, 26 and 28 has a generally rectangular cross-section or can be of a rather square nature.

The conduit union tool 14 of the present invention is particularly designed to fit over the main body 22 of the conduit union 16 and receive the hammer wings 24, 26 and 28 therein. In particular, the conduit union tool 14 of the present invention includes a body 30 having an inner wall 32 formed therein so as to define a generally circular opening. The inner wall 32 is conformable to at least a portion of the outer surface of the main body 22 of the conduit union. The body 30 of the conduit union tool 14 also includes a plurality of wing members 34, 36 and 38 that extend radially outwardly of the body 30 in evenly circumferentially spaced relationship. Within the concept of the present invention, a total three wing members 34, 36 and 38 are illustrated. However, it is possible to include a fewer number of wing members or a greater number of wing members. It can be seen in FIG. 1 that each of the wing members 34, 36 and 38 of the conduit union tool 14 is wider and has a greater length than the respective hammer wings 24, 26 and 28 of the conduit union 16. As such, the wing members 34, 36 and 38 have a larger surface area for receiving the hammer strikes.

As can be seen in FIG. 1, the inner wall 32 of the body 30 of the conduit union tool 14 includes a first cavity 40, a second cavity 42 and a third cavity 44. The first cavity 40 has a shape and size suitable for receiving the hammer wing 24 of the conduit union 16 therein. The cavity 42 has a shape and size suitable for receiving the hammer wing 26 therein. The third cavity 44 has a shape and size suitable for receiving the hammer wing 28 therein. In general, there is a certain degree of space between the walls of the cavities 40, 42 and 44 and the outer surfaces of the hammer wings 24, 26 and 28 therein. This facilitates easy application of the conduit union tool 14 and also allows for the adaptability of the conduit union tool 14 to a variety of sizes of conduit unions.

The body 30 of the conduit union tool 14 includes a first body portion 47 and a second body portion 48. The first body portion 47 is hingedly connected by a hinge 50 to the second body portion 48. Additionally, there is a lock mechanism 52 that is positioned opposite to the hinge 50 so as to assure that the first body portion 47 is locked in position with the second body portion 48 so as to fully enclose the body 30 around the conduit union 16. The hinge 50 and the lock mechanism 52 are of a unique structure and can be interchangeable within the concept of the present invention. The hinge 50 includes a swivel 54 and a swivel head 56. A retaining member 58 serves to fix a position of the swivel head 56 upon the swivel 54. In particular, the swivel head 56 is illustrated as having an orifice extending diametrically therethrough. Similarly, the swivel 54 will also have an orifice extending diametrically therethrough. As such, the retaining member 58 can be inserted through these orifices so as to fix a position of the swivel head 56 upon the swivel 54. As a result, the first body portion 47 is suitable for pivoting with respect to the second body portion 48.

The lock mechanism 52 can have a rod 60 that extends through associated holes formed in the first body portion 47 and the second body portion 48. There is a locking head 62 that is applied to an outward extending end of the rod 60. As such, since both of the ends of the body portions 47 and 48 are retained together, the conduit union tool 14 can be locked securely in position upon the conduit union 16.

Figure 2:
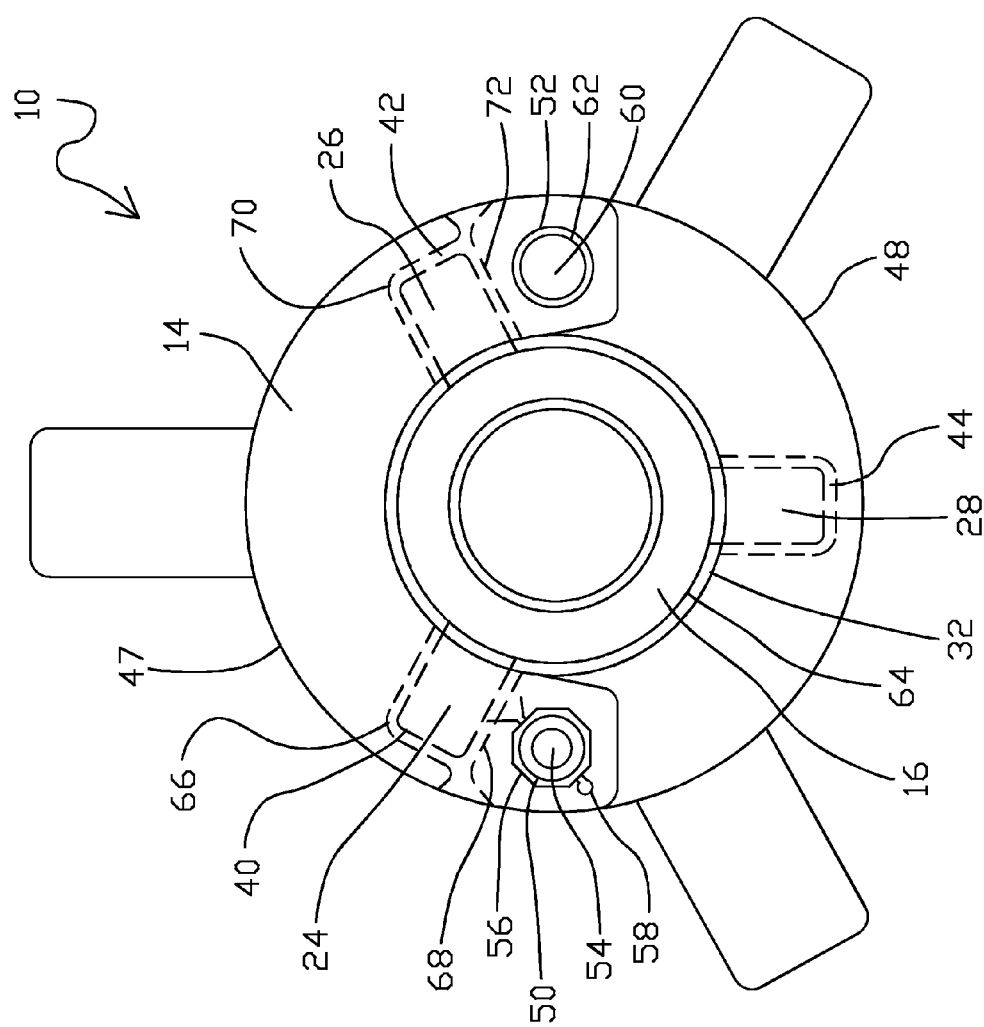
FIG. 2 is an end view showing the apparatus of the conduit union tool of the present invention applied to the hammer wings of a conduit union.

FIG. 2 is an end view of the apparatus 10 of the present invention. In particular, it can be seen that the conduit union 16 has its hammer wings 24, 26 and 28 extending radially outwardly therefrom. The inner surface 32 is illustrated as conforming to a portion of the outer diameter 64 of the conduit union 16. The hammer wings 24, 26 and 28 extend outwardly of this outer diameter 64.

The conduit union tool 14 is illustrated having its cavities 40, 42, and 44 formed therein. In particular, it can be seen that the cavity 40 is formed by a wall 66 located and defined by the inner surface 32 of the conduit union tool. The end surface 68 of the second body portion 48 will define an opposite wall of the cavity 40. As such, the wing member 24 can be fixedly retained between the walls 66 and 68 of the cavity 40. Similarly, the cavity 42 is defined by a wall 70 formed within the first body portion 47 and by an end surface 72 formed at the end of the second body portion 48. As such, the hammer wing 26 of the conduit union 16 will be retained between walls 70 and 72. The cavity 44 is formed directly in the inner surface 32 so as to extend into the second body portion 48. The various walls of the respective cavities 40, 42, and 44 provide a very sturdy and strong surface with which to apply forces to the respective hammer wings 24, 26 and 28.

In FIG. 2, it can be seen that the hinge 50 is formed by the swivel 54 and the swivel head 56. The retaining member 58 engages the swivel head 56 and the swivel 54 so as to establish the proper pivotal connection between the body portions 47 and 48. The lock mechanism 52 is formed by the locking head 62 that is applied over the rod 60.

Figure 3:
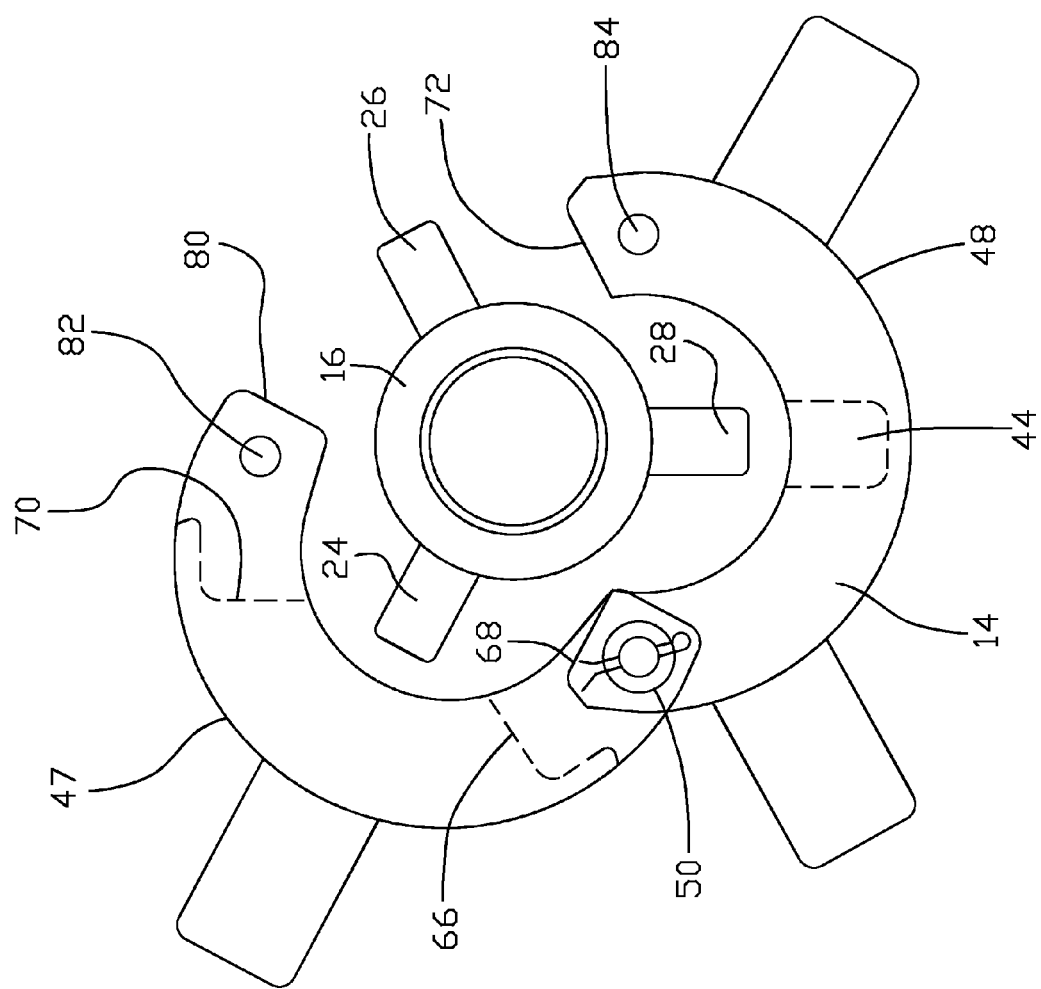
FIG. 3 illustrates the hinged connection between the first and second body portions of the conduit union tool of the present invention.

FIG. 3 illustrates how the first body portion 47 of the conduit union tool 14 can be pivoted about the hinge 50 so as to move in an open position for the receipt of the conduit union 16 therein. The ease of installation of the conduit union 16 is due to the fact that the end surfaces 68 and 72 of the second body portion 48 will serve as part of the walls of the cavity. In order to install the conduit union tool 14, it is only necessary to open the first body portion 47 with respect to the second body portion 48 about the hinge 50. The conduit union 16 can be inserted into the space between the end surface 80 of the first body portion 47 and the end surface 72 of the second body portion 48. The hammer wing 28 can then be inserted into the cavity 44. The end surface 80 of the first body portion 47 can then be pivoted toward the end surface 72 of the second body portion 48 about the hinge 50. As a result, the hammer wing 24 will ultimately reside against the wall 66 of the first body portion 47 and against the end surface 68 of the second body portion 48. The hammer wing 26 will then reside between the end surface 72 of the second body portion 48 and the inner wall 70 of the first body portion 47.

In FIG. 3, it can be seen that there is a hole 82 formed in the first body portion 47 and a hole 84 formed in the second body portion 48. When the first body portion 47 is moved toward the second body portion 48, the holes 82 and 84 will align. As a result, the rod 60 can be inserted through the holes 82 and 84 and the locking head 62 fixed over the end of the rod 60 so as to lock the first body portion 47 to the second body portion 48.

Figure 4:
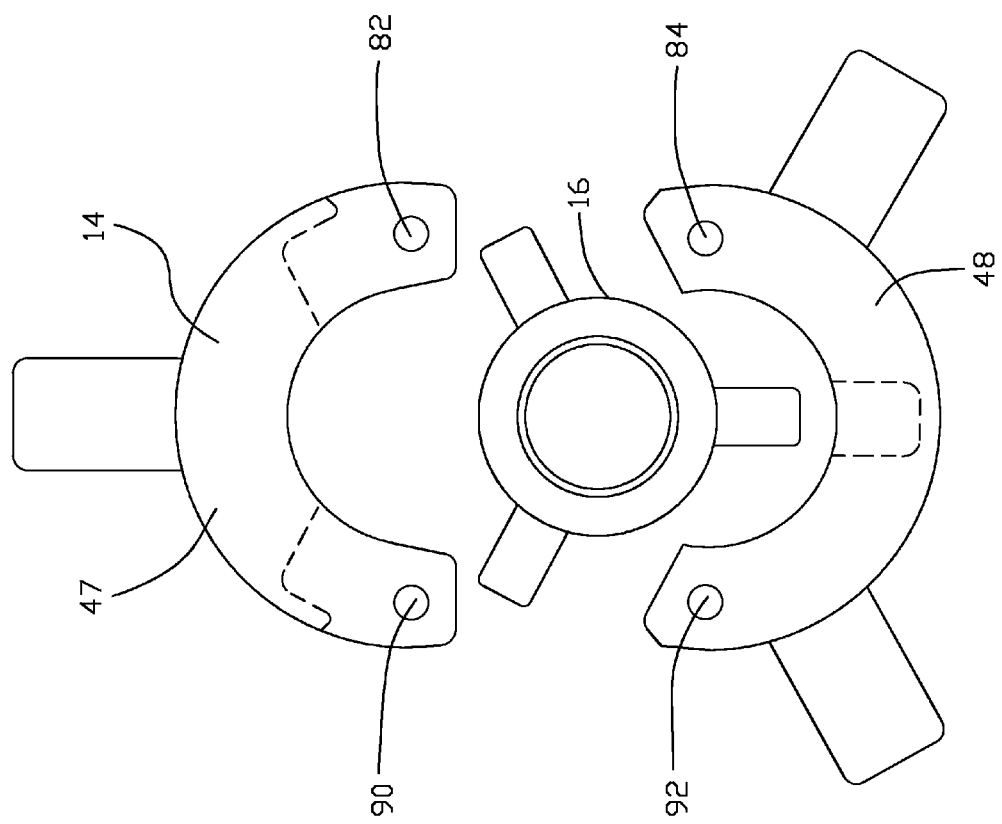
FIG. 4 is an exploded view showing the first and second body portions of the conduit union tool of the present invention in a position for application upon the conduit union.

FIG. 4 shows another technique for the installation of the conduit union 16 with the conduit union tool 14. As can be seen in FIG. 4, the first body portion 47 is separated from the second body portion 48. The first body portion 47 has holes 82 and 90. Similarly, the second body portion 48 has holes 92 and 84 formed adjacent to the ends thereof. The conduit union 16 can be placed between the first body portion 47 and the second body portion 48. The first body portion 47 can then be moved such that the holes 90 and 92 coincide and such that the holes 82 and 84 coincide. As such, locking members or hinged members (in the nature of those described hereinbefore) can be inserted into the coinciding holes so as to lock the first body portion 47 with the second body portion 48 in a closed position over the conduit union 16.

Figure 5:
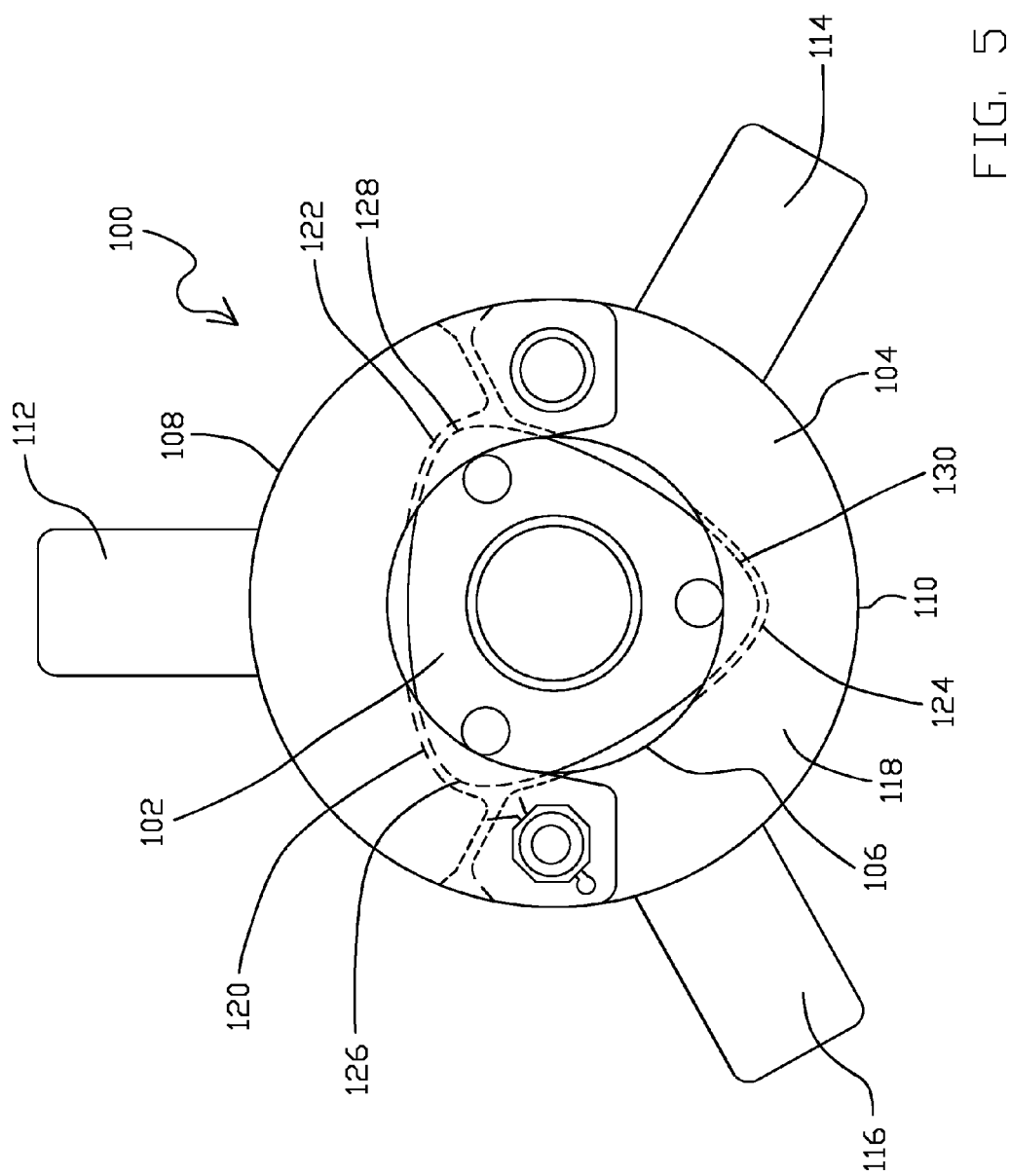
FIG. 5 is an end view showing the application of the conduit union tool of the present invention upon a triangular-shaped conduit union without wings.

FIG. 5 shows an alternative embodiment of the apparatus 100 to the present invention. The apparatus 100 includes a conduit union 102 and a conduit union tool 104. The conduit union 102 has an outer diameter of a generally triangular shape. As such, the inner wall 106 of the conduit union tool 104 will have a shape that conforms to the shape of the vertices of the triangular-shaped conduit union 102.

The conduit union tool 104 also includes a first body portion 108 and a second body portion 110. The first body portion 108 has a wing member 112 extending radially outwardly therefrom. The second body portion 110 has wing members 114 and 116 extending outwardly therefrom. The body portions 108 and 110 can be pivoted with respect to each other and locked with respect to each other in the manner described in the previous embodiment of the present invention.

As can be seen in FIG. 5, the inner wall 106 of the body 118 of the conduit union tool 104 has corners 120, 122 and 124 which fit closely in relationship to the respective vertices 126, 128 and 130 of the conduit union 102. As such, when hammer strikes are applied to the wing members 112, 114, and 116, the conduit union 102 can be engaged by the corners 120, 122 and 124 so as to facilitate the rotation of the conduit union 102.

Figure 6:
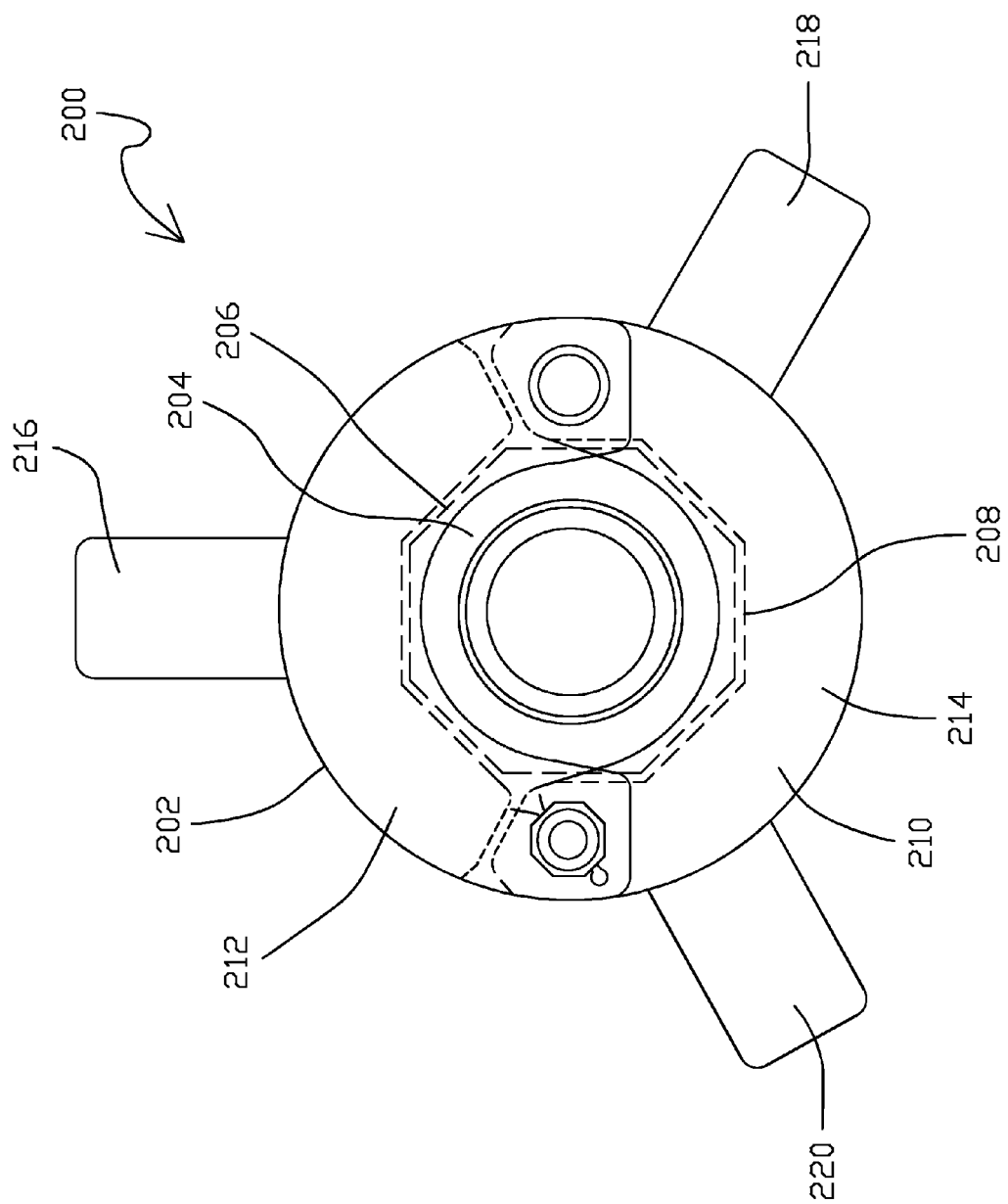
FIG. 6 is an end view showing the application of the conduit union tool of another embodiment of the present invention upon a polygonal-shaped conduit union.

FIG. 6 shows an alternative embodiment of the apparatus 200 of the present invention. Apparatus 200 includes a conduit union tool 202 and a conduit union 204. The conduit union 204 has an outer surface 206 that is of a polygonal construction. As such, the inner surface 208 of the body 210 of the conduit union tool 202 will have a shape that conforms to the surfaces 206 of the conduit union 204.

The conduit union tool 202 includes a first body portion 212 and a second body portion 214. The body portions 212 and 214 can be pivoted between an open position and a closed position. In the closed position, suitable locking members can be applied so as to lock the body portions 212 and 214 into the closed position. As such, the inner surface 208 will conform to the polygonal surface 206 of the conduit union 204. As such, when hammer strikes are applied to the wing members 216, 218 and 220, the rotational forces can be applied to the polygonal surface 206 of the conduit union 204. The polygonal surface 206 can be in the nature of a hexagon or in the nature of an octagon. Various other irregular-shaped surfaces of the conduit union can also be utilized in association with the teachings of the present invention.

The conduit union tool of the present invention is adaptable to a wide range of standard pressure ranges of such conduit unions. The conduit union tool of the present invention is adapted for use for all type of hexagonal, octagonal and otherwise polygonal union nuts, along with multi-point externally connectable configurations. The conduit union tool is also applicable to all hammer unions that include a triangular or bisected external pattern. As such, the present invention is adaptable to all conduit unions that were previously utilized in association with pipe-type wrenches, crescent-type wrenches and industry standard hydraulically-actuated make up and break-out tooling devices.

The present invention is capable of receiving the hexagonal or octagonal wing nut union so as to provide a near-equalizing loosely contactable external grippage toward the individual planar contact points. As such, the present invention avoids the "rounding off" that can result from the application of various other tools to the exterior surface of such hexagonal, octagonal, or polygonal wing nut unions.

The present invention acts as a quickly connectable and safe alternative replacement device in order to quickly and safely apply a multi-point series of extended and elongated strike points. As such, the present invention avoids any damage to the conduit union assembly. As a result, the costly need for immediate replacement of externally damaged conduit unions is effectively avoided. Additionally, the present invention, by providing very large strike points associated with the wing members, avoids damage to items located in proximity to the conduit union. As such, the present invention offers a significant reduction in overall upstream and downstream pipe in industrial flow line plumbing system maintenance costs. The present invention further avoids any maintenance-based reconstruction downtime, in order to replace damaged conduit unions.

The conduit union tool of the present invention has larger and more elongated wing members in order to significantly reduce or eliminate the possibility of the user generating an accidental miss strike toward the wing members with the use of a sledgehammer. As such, the situation where the sledgehammer might strike the lower extremities of the sledgehammer user is effectively avoided with the conduit union tool of the present invention. Additionally, the present invention avoids those problems that are associated with the accidental slippage of pipe wrench tools when such pipe wrenches are applied to the conduit unions. As a result, the present invention minimizes the potential liabilities associated with personal injury.

The conduit union tool of the present invention, by minimizing the number of miss-strikes applied by a sledgehammer reduces the amount of physical exhaustion than can occur to the worker in the areas in which the conduit union is used. Conduit unions are often used in areas of high temperature. As such, the maximization of the ability to effectively manipulate the conduit union, through the use of the conduit union tool of the present invention, will minimize the amount of time that the worker actually has to work in such a high temperature environment.

The conduit union tool of the present invention further increases the level of safety in the workplace by reducing the possibility that the user will apply a forceful sledgehammer strike and accidentally miss the contact area of the conduit union tool. As such, those problems associated with the application of the sledgehammer to outlying secondary materials found in the area of the conduit union is effectively avoided. As such, potential damage to workplace piping or plumbing systems, fittings, adapters, or dangerous electrical components, is effectively avoided.

The conduit union tool of the present invention has an interior cavity that is adaptable to a wide range of exterior surfaces of the conduit unions. As such, the inner surface of the conduit union tool of the present invention can be formed of any necessary size, shape, contour or shrouded configuration to fit the needs of the user.

The present invention effectively applies forces around the entire 360° circumference of the conduit union tool. As such, the present invention will distribute forces applied by the sledgehammer directly over the entire conduit union rather than directly against a single wing of the conduit union. This near-equal force strike pressure distribution provides an increased ability of the conduit union tool to improve the ability to quickly and safely assemble or disassemble the conduit union. It also enhances the ability to effectively break-out those conduit unions that are frozen into position.

In the past, there existed conditions whereby the conduit union assembly appeared to be fully installed within a companion flow line piping section. As such, the installation personnel would incorrectly consider that the conduit union has been properly installed to an exacting standard. As such, the installer would believe that the conduit union has been installed safely. In reality, the actual conduit union would be slightly off the near direct center of the main linear plane of the flow line piping. This would result in the fact that the joined conduit union assembly would be very difficult to remove, readjust or disassemble at a later period of time. As such, the present invention facilitates the ability to properly install the conduit union so as to assure a direct linear plane of the correct flow line direction.

The conduit union tool can be easily removed once applied over the conduit union. All that is necessary is to release the locking mechanism. As such, the body portions can be pivoted away from one another so that the conduit union tool can be applied to another conduit union. As such, this provides for continued repeatability and reusability for a large variety of additional conduit unions. In particular, the present invention can be rapidly applied in those circumstances where all of the conduit unions have generally the same size and pressure rating.

Because of the wider surface area of the wing members associated with the conduit union tool of the present invention, the user can be more inclined to apply greater force toward the wing members than to the relatively small wings associated with the conduit union. As such, the application of greater forces allows the user to significantly reduce the overall time frame necessary to assemble or disassemble the conduit union. The wider surface area provided by the wing members of the conduit union tool also facilitates the ability to install and remove the conduit unions in tightly confined work space environments.

Further, the conduit union tool of the present invention provides great perpendicular/lateral stability when in the closed position. As such, the conduit union tool will not rock or wobble back and forth against the perpendicular plane of the flow line direction because it encloses the hammer wings of the conduit union on all sides. The conduit union tool is thus very stable enabling the user to apply a greater amount of force than he or she would otherwise apply.

The conduit union tool of the present invention can be securably attached and affixed into a service or closed position by means of any form of safe and effective securing techniques, such as industry-standard lock pin, bolts having nuts, automatic locking pin configurations, snap-lock type methods and other general means for affixing the body portions of the conduit union tool together.

The conduit union tool can be maintained in its service position indefinitely. This can occur without any harmful affects to the conduit union assembly. When the conduit union tool is continued to be maintained over the conduit union, the conduit union tool provides additional protection to the exterior surfaces of the conduit union during such time.

The present invention further prevents intentional vandalism or sabotage. The conduit union is not capable of being easily manipulated, readjusted or removed. As such, it provides a near failsafe conduit union assembly which cannot be modified or altered without the authorized use of the particular conduit union tool. The conduit union tool also prevents and eliminates the possibility of sabotage and/or terrorism.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A tool apparatus for use with a conduit union, the conduit union having a non-circular or irregular outer surface, the conduit union having a plurality of hammer wings extending radially outwardly therefrom, the tool apparatus comprising:
    a body having an interior wall, said interior wall adapted to conform to at least a portion of the outer surface of the conduit union, said body having a first body portion and a second body portion connected at a hinge connection, said interior of said body defining a plurality of cavities each having a rectangular cross-section, said plurality of cavities adapted to [receive] the plurality of hammer wings therein, one cavity of said plurality of cavities defined by an end of one of said first and second body portions opposite said hinge connection and a surface formed inwardly of an end of the other of said first and second body portions opposite said hinge connection, said first and second body portions of said body movable about said hinge connection between an open position and a closed position, said closed position suitable for extending around and locking over the conduit union;
    a plurality of wing members extending radially outwardly of said body; and
    a lock mechanism cooperative with said first and second body portions so as to lock said first and second body portions in said closed position.

2. The tool apparatus of claim 1, the conduit union having three hammer wings evenly circumferentially spaced therearound, said plurality of cavities being in evenly circumferentially spaced relationship, said plurality of cavities of said body suitable for receiving the three hammer wings of said conduit union.

3. The tool apparatus of claim 1, said lock mechanism positioned opposite said hinge connection.

4. The tool apparatus of claim 1, said first body portion having a first hole formed therein, said second body portion having a first hole formed therein, said first holes of said first and second body portions coinciding, said hinge connection comprising:
    a swivel extending through said first holes of said first and second body portions;
    a swivel head affixed to an end of said swivel; and
    a retaining member extending through an orifice of said swivel and through an orifice of said swivel head so as to lock said swivel head to said swivel.

5. The tool apparatus of claim 4, said first body portion having a second hole formed away from said first hole of said first body portion, said second body portion having a second hole formed away from said first hole of said second body portion, said second holes of said first and second body portions coinciding when said body is in said closed position, the lock mechanism comprising:
    a rod extending through said second holes of said first and second body portions, said rod having an end extending outwardly; and
    a locking head affixed to said end of said rod.

6. The tool apparatus of claim 5, said locking head being releaseably secured to said end of said rod, said rod being removably received in said second holes of said first and second body portions.

7. The tool apparatus of claim 1, said first body portion having a side wall overlying a portion of a side wall of said second body portion.

8. A tool apparatus comprising:
    a conduit union having a plurality of hammer wings extending radially outwardly therefrom;
    a body having an interior wall, said interior wall conformable to at least a portion of an outer surface of the conduit union, said interior wall of said body having a plurality of cavities formed therein, said plurality of cavities respectively receiving said plurality of hammer wings of said conduit union therein, said body movable between an open position and a closed position, said closed position extending around and locking over said conduit union; and
    a plurality of wing members extending radially outwardly of said body, each of said plurality of wing members having a length substantially greater than a length of said hammer wings of said conduit union.

9. An apparatus comprising:
    a conduit union having a plurality of hammer wings extending radially outwardly therefrom, said plurality of hammer wings each having a rectangular cross-section;
    a body having an interior wall, said interior wall defining a plurality of cavities within said body, said body movable between an open position and a closed position, said conduit union having a plurality of hammer wings received respectively in said plurality of cavities when said body is in said closed position, said body extending around said conduit union in said closed position;

a first body portion; and a second body portion connected to the first body portion, at least a portion of the second body portion being separated from said first body portion when said body is in said open position, an end of one of said first and second body portions and a surface inwardly of an end of another of said first and second body portions defining one of said plurality of cavities.

10. The tool apparatus of claim 9, said first body portion being hingedly connected to said second body portion such that said first body portion can pivot outwardly away from said second body portion to said open position so as to allow said conduit union to be received in said interior of said body.

11. The apparatus of claim 10, further comprising:

a locking means for fixing said first and second body portions in said closed position.

12. The apparatus of claim 9, each of said plurality of wing members of said body having a length substantially greater than a length of each of said plurality of hammer wings of said conduit union.

13. The apparatus of claim 9, each of said plurality of wing members of said body having a width substantially greater than a width of each of said plurality of hammer wings of said conduit union.

\* \* \* \* \*